United States Patent
Barlsen et al.

(10) Patent No.: US 9,045,143 B2
(45) Date of Patent: Jun. 2, 2015

(54) ELECTRONIC BRAKE CONTROL DEVICE FOR A VEHICLE

(75) Inventors: Holger Barlsen, Langenhagen (DE); Rainer Risse, Pattensen-Reden (DE); Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/130,570

(22) PCT Filed: May 18, 2012

(86) PCT No.: PCT/EP2012/002129
§ 371 (c)(1),
(2), (4) Date: Jan. 2, 2014

(87) PCT Pub. No.: WO2013/013732
PCT Pub. Date: Jan. 31, 2013

(65) Prior Publication Data
US 2014/0149002 A1    May 29, 2014

(30) Foreign Application Priority Data

Jul. 23, 2011 (DE) .......................... 10 2011 108 449

(51) Int. Cl.
*B60W 50/00* (2006.01)
*B60T 13/66* (2006.01)
*B60T 17/22* (2006.01)
(Continued)

(52) U.S. Cl.
CPC ................ *B60W 50/00* (2013.01); *B60T 13/66* (2013.01); *B60T 17/221* (2013.01); *B60R 16/0234* (2013.01); *G07C 5/008* (2013.01); *G07C 5/085* (2013.01); *B60R 16/023* (2013.01); *B60T 17/22* (2013.01)

(58) Field of Classification Search
USPC ............................................................ 701/48
See application file for complete search history.

(56) References Cited

U.S. PATENT DOCUMENTS 6,823,244 B2 * 11/2004 Breed .......................... 701/29.7
7,284,769 B2 * 10/2007 Breed .......................... 280/735
(Continued)

FOREIGN PATENT DOCUMENTS

DE          100 56 565 A1    8/2002
DE     10 2005 048 534 A1    4/2007
(Continued)

OTHER PUBLICATIONS

Fleet+ V3; Technical Information; Sep. 2009 (unauthenticated date); www.haldex.com.
(Continued)

*Primary Examiner* — Thomas Tarcza
*Assistant Examiner* — Alex C Dunn
(74) *Attorney, Agent, or Firm* — Kramer Levin Naftalis & Frankel LLP

(57) ABSTRACT

An electronic brake control device for a vehicle includes one or more output connections for activating one or more vehicle components that are not part of the vehicle brake system. The electronic brake control device includes a memory which has at least one memory location for storing operational data of a vehicle component that is connected to a respective output connection. The electronic brake control device is configured to detect data characterizing the operation of the connected vehicle component, collect the data as an overall operating value of the vehicle component, and store the data in the assigned memory location.

14 Claims, 2 Drawing Sheets

(51) Int. Cl.
*B60R 16/023* (2006.01)
*G07C 5/00* (2006.01)
*G07C 5/08* (2006.01)

(56) References Cited

U.S. PATENT DOCUMENTS

| | | | |
|---|---|---|---|
| 2005/0134440 A1* | 6/2005 | Breed | 340/435 |
| 2008/0147280 A1* | 6/2008 | Breed | 701/46 |
| 2010/0217495 A1* | 8/2010 | Heise et al. | 701/70 |
| 2010/0252378 A1 | 10/2010 | Hilberer | |
| 2011/0042975 A1* | 2/2011 | Faruque | 293/118 |

FOREIGN PATENT DOCUMENTS

| | | |
|---|---|---|
| DE | 10 2007 024 310 A1 | 11/2008 |
| DE | 10 2007 037 346 A1 | 2/2009 |
| EP | 2 189 921 A3 | 5/2010 |

OTHER PUBLICATIONS

EB+ Operator's Guide; Copyright 2009; www.haldex.com.
Magazine: The Customer Magazine of Haldex Europe; Issue No. 20; Spring/Summer 2010; www.haldex.com.

* cited by examiner

ELECTRONIC BRAKE CONTROL DEVICE FOR A VEHICLE

FIELD OF THE INVENTION

The invention generally relates to the management of vehicles with respect to maintenance and servicing, and, more particularly, to improvements concerning electronic brake control devices.

BACKGROUND OF THE INVENTION

It is known that, for road vehicles, certain service intervals prescribed by the manufacturer have to be complied with. In the field of utility vehicles, i.e. trucks and their trailers, the technical equipment has increasingly become more complex. At the same time, there is a need to optimize servicing and maintenance costs.

SUMMARY OF THE INVENTION

Generally speaking, it is an object of the present invention to leverage the vehicle electronic brake control device to reduce the servicing and maintenance costs of the vehicle without a large amount of additional expenditure.

In accordance with embodiments of the present invention, the electronic brake control device has one or more output connections for activating one or more vehicle components that are not part of the brake system of the vehicle. The electronic brake control device also has a memory for storing data. The memory has at least one memory location for storing operational data of a vehicle component that is connected to an output connection. The electronic brake control device is configured to detect/determine data characterizing the operation of the connected vehicle component, collect it as an overall operational value of the vehicle component, and store it in the assigned memory location.

Advantageously, by providing at least one or, when appropriate, multiple storage locations for storing the operational data of vehicle components, it is possible to reduce maintenance and servicing costs since they can be adapted to the respective specific requirements of the monitored vehicle components. The service intervals of the vehicle components, which are monitored in terms of their operational data, no longer have to be defined synchronously with the vehicle service intervals. It is therefore possible, for example in the case of vehicle components that are operated relatively rarely in a specific vehicle, to determine this quickly on the basis of the overall operational values of the vehicle components, which can be read out from memory. As a result, when a vehicle is at a workshop, it can be quickly determined whether a vehicle component does not require any work. In contrast, in the case of a vehicle with more frequent use of the vehicle component, a need for maintenance can be detected earlier.

For determining the overall operational value, the electronic brake control device already has, in any ease, one or more output connections for connecting and for activating one or more vehicle components. Such electronic brake control devices are ubiquitous in trailer vehicles with electronically controlled brake systems, and generally already have a memory. So, in this respect, there is no need for additional costs to be incurred.

The present invention can be used in utility vehicles, i.e., in tractor vehicles and trailer vehicles, for example, semitrailers and drawbar trailers.

The present invention has application with respect to, for example, vehicle components such as walking floors, provided as moveable floors for loading and unloading a vehicle, or sliding covers, such as are provided, for example, in tippers for covering the load. Depending on the type of use and the frequency of use of the individual vehicle components, it is therefore possible to easily carry out maintenance that is adapted to the overall operational value.

It will be appreciated that, with the invention, it is possible to monitor a plurality of vehicle components for a respective overall operational value, wherein at least one assigned memory location for the respective overall operational value is provided for each vehicle component. Depending on the vehicle component, it is also possible to detect a plurality of types of data, for example duration and number of activations, characterizing the operation of the connected vehicle component, and store them as respective overall operational values in separate memory locations. In the case of monitoring a relatively large number of vehicle components that are controlled by the electronic brake device via the output connections, it is easily and quickly possible to provide an overview of the entire servicing state of the vehicle, for example by virtue of the fact that the individual overall operational values are read out from the memory locations and displayed visually and/or compared automatically with limiting values, and these results displayed.

The data characterizing the operation of the connected vehicle component can be, for example, the switch-on times of the connected vehicle component and/or the switch-on frequency of the connected vehicle component. If the switch-on times of the connected vehicle component are monitored, they are measured by the electronic brake control device and summed as an overall operational value, which then corresponds to an overall operational period, and are stored in the assigned memory location. If the switch-on frequency of the connected vehicle component is detected as data characterizing the operation of the connected vehicle component, the switch-on frequency, i.e., the number of activations, is counted by the electronic brake control device and summed as an overall operational value, which corresponds, in this case, to an overall switch-on frequency, and stored in the assigned memory location.

According to an embodiment Of the present invention, the electronic brake control device is configured to measure the switch-on times of the connected vehicle component, sum them as an overall operational period of the vehicle component, store them in an assigned first memory location, and additionally count the switch-on frequency of the connected vehicle component, sum it as an overall switch-on frequency of the vehicle component, and store it in an assigned second memory location. This has the advantage that the operation of the vehicle component can be detected and monitored with respect to various data items that characterize the operation, which permits more in-depth monitoring.

According to another embodiment of the present invention, the electronic brake control device has a telematics unit or an interface with a telematics unit provided in the vehicle. The telematics unit is configured for wireless data transmission of data from the vehicle to a remote receiver station. This has the advantage that a quasi-permanent monitoring of the service station of a vehicle is possible from a distance, for example, from a control station of a logistical or forwarding company, which operates a fleet of vehicles. In the receiver station, which can be part of the specified control station, the data of the vehicle can be consolidated and processed together with the data of other vehicles. This permits for improved planning of vehicle deployment, including predicting when individual vehicles need to visit a workshop.

According to another embodiment, the electronic brake control device is configured to transmit the overall operational value of the vehicle component, stored in the memory location, to the remote receiver station via the telematics unit. The transmission can be initiated, for example, by the electronic brake control device, for example in the form of a transmission at fixed time intervals or when certain events occur, for example when the stored overall operational value reaches a predefined limiting value requiring maintenance of the assigned vehicle component. It is also possible to provide that the overall operational value stored in the memory location is interrogated for initiatives of the remote receiver station and is then transmitted from the electronic brake control device via the telematics unit.

According to a further embodiment, the electronic brake control device is configured to monitor the overall operational value of the vehicle component to determine whether a maximum value was reached or exceeded, and to generate a warning signal when the maximum value is reached or exceeded. The warning signal may be, for example, an acoustic or visual signal in the vehicle or in the towing vehicle that signals to the driver. In particular, a warning signal can be generated that indicates a requirement for servicing. The warning signal can also be transmitted to the remote receiver station via the telematics unit, with the result that the warning signal can be evaluated there as an indication of a need for the vehicle to be serviced.

According to yet another embodiment, the memory has at least one memory location for storing operational data of at least one brake system component that is controlled by the electronic brake control device, wherein the electronic brake control device is configured to detect data characterizing the operation of the connected brake system component to collect the data as an overall operational value of the brake system component and to store it in the assigned memory location. This has the advantage that, if brake system components need servicing, they can also be included in servicing and maintenance planning; and each brake system component can be automatically monitored separately by overall operational values, such as, for example, overall operational period and/or overall switch-on frequency. It is thus possible, for example, to monitor the switch-on period and/or the switch-on frequency of solenoid valves of an anti-lock brake system.

According to a further embodiment of the present invention, a diagnostic device is provided, which is configured to communicate via a diagnostic interface with the electronic brake control device, and, in the process, to read out the overall operational value of the vehicle component stored in the memory location and/or the overall operational value of the brake system component from the electronic brake control device and to evaluate and/or display these values.

According to another embodiment, a receiver station is provided, which is configured to receive the data of the telematics unit of a vehicle having an electronic brake control device. The receiver station is configured to read out the overall operational value of the vehicle component stored in the memory location and/or the overall operational value of the brake system component from the electronic brake control device and to evaluate and/or display these values.

According to a still further embodiment of the present invention, a computer program is provided which is configured to communicate with the electronic brake control device, and, in the process, to read out the overall operational value of the vehicle component stored in the memory location and/or the overall operational value of the brake system component from the electronic brake control device, and to evaluate and/or display these values.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

The invention will be explained in more detail below on the basis of exemplary embodiments with reference to the accompanying drawings, in which.

Identical reference symbols are used for corresponding elements in the figures.

DETAILED DESCRIPTION OF THE PREFERRED EMBODIMENTS

Figure 1:
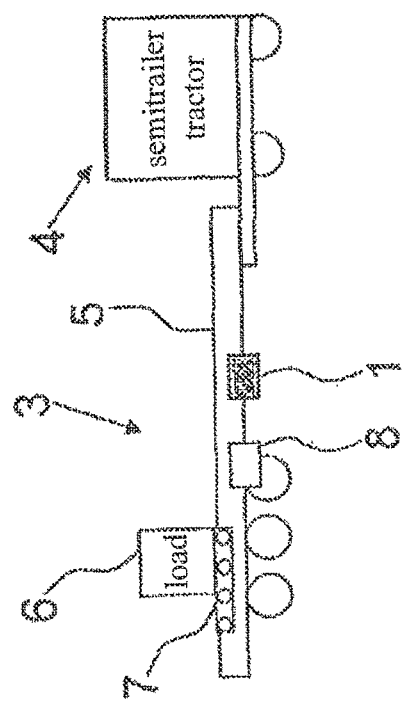
FIG. 1 shows a vehicle comprising a towing vehicle and a trailer.

FIG. 1 is a schematic illustration of a semitrailer tractor 4 with a trailer 3 coupled thereto in the form of a semitrailer. The trailer 3 has a loading surface 5. Arranged in the region of the loading surface 5 is a moveable loading floor 7 with an electric drive that can be activated by an electrical signal. By activating the moveable loading floor 7, it is possible to move a load 6 arranged on the loading floor 7. As a result, the loading and unloading of the loading surface 5 can be simplified.

The trailer 3 has an electronically controlled brake system controlled by an electronic brake control device 1. The electronic, brake control device 1 can have, for example, control electronics and electrical actuators in the form of solenoid valves. The electronic brake control device 1 is connected to the wheel brakes of the trailer 3. For an example of the wheel brakes, a wheel brake 8 is illustrated in FIG. 1. The electronic brake control device 1 is also connected via an electrical line or a data bus to the loading floor 7, which can be moved and which is provided as a vehicle component that is not part of the brake system of the trailer 3.

Figure 2:
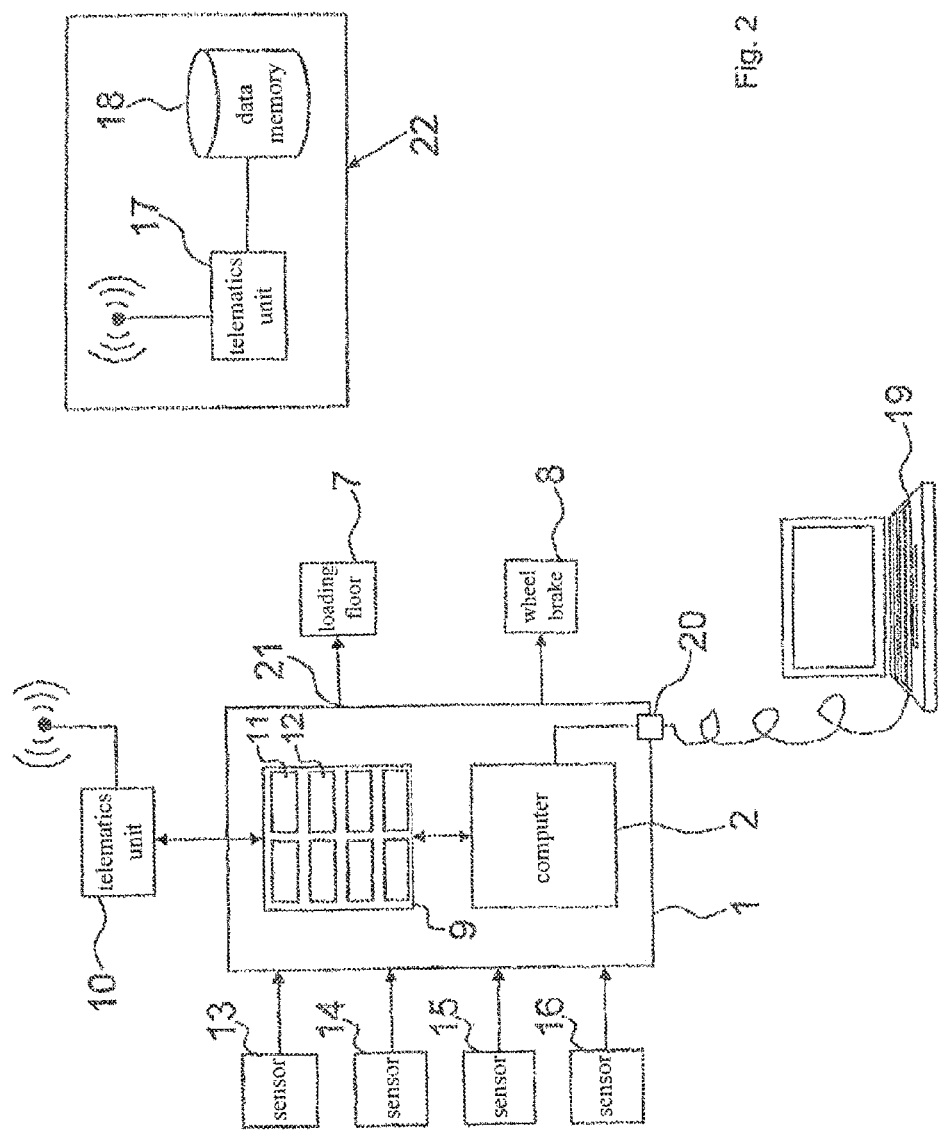
FIG. 2 shows an electronic brake control device for a vehicle according to an embodiment of the present invention.

Referring to FIG. 2, which shows the electronic, brake control device 1 in greater detail, the electronic brake control device 1 can be connected to a plurality of sensors 13, 14, 15, 16 in order to detect input signals, for example with wheel rotational speed sensors via which the wheel rotational speeds of individual wheels of the trailer 3 can be detected. The electronic brake control device has one or more output connections 21 configured such that one or more vehicle components that are not part of the brake system of the vehicle are connected thereto and controlled by the electronic brake control device. The loading floor 7, which can be moved, is connected to the output connection 21. The electronic, brake control device 1 is also connected to the wheel brake 8, as already explained above with reference to FIG. 1. The electronic brake control device 1 has a computer 2 for carrying out a control program, for example in the form of a microcomputer or microcontroller. The electronic brake control device 1 also has a memory 9 for storing data. The memory 9 can be provided as a separate component or as a memory integrated into the computer 2.

The memory 9 has multiple memory locations, of which a first memory location 11 and a second memory location 12 are denoted by way of example. The first memory location 11 serves to detect the switch-on period of the wheel brake 8, the second memory location 12 serves to detect the switch-on period of the moveable loading floor 7. The respective switch-on period of the wheel brake 8 and of the moveable loading floor 7 are summed at the respective memory location 11, 12 and stored as overall operational values. These steps are carried out by the computer 2, which also controls the switching on and switching off of the moveable loading floor 7 and controls the activation of the wheel brake 8, respectively.

In order to read out the memory 9, in particular the first memory location 11 and the second memory location 12, a diagnostic device 19 can be connected to the electronic brake control device 1 via an electrical connection 20. The diagnostic device 19 can be, for example, a commercially available computer with a diagnostic program installed thereon. The diagnostic device 19 communicates with the computer 2 such that the computer 2 transmits the overall operational values stored at the first memory location 11 and the second memory location 12 to the diagnostic device 19. The diagnostic device 19 evaluates this data and displays the data and/or the results of the evaluation on a display.

The electronic brake control device 1 is also connected to a telematics unit 10. The telematics unit 10 can be arranged on or in the trailer 3 or the towing vehicle 4. The telematics unit 10 can also be part of the electronic brake control device 1. The telematics unit 10 is configured to wirelessly transmit data to a remote receiver station 22. The remote receiver station 22 also has a telematics unit 17 and is configured to evaluate and store the received data, e.g., by means of the data memory 18 shown in FIG. 2. The telematics units 10, 17 are respectively designed to convey data bidirectionally, i.e., to transmit and to receive.

The electronic brake control device 1 has a control program, which is run on the computer 2, in which the overall operational values stored in the first memory location 11 and the second memory location 12 are transmitted at regular time intervals to the remote receiver station 22 via the telematics unit 10. In the receiver station 22, the received overall operational values are stored in the data memory 18. In addition, an evaluation can be carried out to determine whether service interval limits have been reached and a need for maintenance has been displayed in the receiver station 22.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. An electronic brake control device for a vehicle, the electronic brake control device comprising: at least one output connection to and configured to activate at least one vehicle component that is not part of a brake system of the vehicle, the at least one vehicle component comprising a loading component configured to at least one of load the vehicle and secure a load to the vehicle; and a memory having at least one memory location for storing operational data of the connected at least one vehicle component, wherein the electronic brake control device is configured to determine and store in the at least one memory location data characterizing the operation of the connected at least one vehicle component including as an overall operational value of the vehicle component.

2. The electronic brake control device as claimed in claim 1, wherein the data characterizing the operation of the connected at least one vehicle component includes switch-on times of the connected at least one vehicle component.

3. The electronic brake control device as claimed in claim 1, wherein the data characterizing the operation of the connected at least one vehicle component includes a switch-on frequency of the connected at least one vehicle component.

4. The electronic brake control device as claimed in claim 1, further comprising one of (i) a telematics unit and (ii) an interface with a telematics unit in the vehicle, the telematics unit being configured for wireless data transmission of data from the vehicle to a remote receiver station.

5. The electronic brake control device as claimed in claim 4, wherein the electronic brake control device is configured to transmit the overall operational value of the connected at least one vehicle component stored in the at least one memory location to the remote receiver station via the telematics unit.

6. The electronic brake control device as claimed in claim 1, wherein the electronic brake control device is configured to monitor the overall operational value of the connected at least one vehicle component to determine whether a maximum value is one of reached and exceeded, and to generate a warning signal when the maximum value is one of reached and exceeded.

7. The electronic brake control device as claimed in claim 1, wherein the at least one memory location stores operational data of at least one brake system component controlled by the electronic brake control device, and wherein the electronic brake control device is configured to determine and store in the at least one memory location data characterizing the operation of the connected at least one brake system component including as an overall operational value of the at least one brake system component.

8. A diagnostic device configured to communicate via a diagnostic interface with the electronic brake control device as claimed in claim 1, and to obtain and at least one of evaluate and display the overall operational value of the connected at least one vehicle component stored in the at least one memory location.

9. A receiver station configured to receive data of a telematics unit of a vehicle having the electronic brake control device as claimed in claim 1, and to obtain and at least one of evaluate and display the overall operational value of the connected at least one vehicle component stored in the at least one memory location.

10. A computer program product comprising a non-transitory medium storing computer executable program logic to effect communication with the electronic brake control device as claimed in claim 1 to obtain and at least one of evaluate and display an overall operational period of the connected at least one vehicle component stored in the at least one memory location.

11. A diagnostic device configured to communicate via a diagnostic interface with the electronic brake control device as claimed in claim 7 to obtain and at least one of evaluate and display the overall operational value of the at least one brake system component stored in the at least one memory location.

12. A receiver station configured to receive data of a telematics unit of a vehicle having the electronic brake control device as claimed in claim 7, and to obtain and at least one of evaluate and display the overall operational value of the at least one brake system component stored in the at least one memory location.

13. A computer program product comprising a non-transitory medium storing computer executable program logic to effect communication with the electronic brake control device as claimed in claim 7 to obtain and at least one of evaluate and display an overall operational period of the at least one brake system component stored in the at least one memory location.

14. The electronic brake control device as claimed in claim 1, wherein the loading component comprises at least one of a movable loading surface and a sliding cover for a tipper.

* * * * *